(12) United States Patent
Guemmer

(10) Patent No.: US 8,038,409 B2
(45) Date of Patent: Oct. 18, 2011

(54) TURBOMACHINE WITH ROTORS OF HIGH SPECIFIC ENERGY TRANSFER

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1104 days.

(21) Appl. No.: 11/808,568

(22) Filed: Jun. 11, 2007

(65) Prior Publication Data
US 2008/0025840 A1    Jan. 31, 2008

(30) Foreign Application Priority Data
Jun. 9, 2006 (DE) .......... 10 2006 026 968

(51) Int. Cl.
*F04D 29/38* (2006.01)

(52) U.S. Cl. .............................. 416/243; 416/223 R

(58) Field of Classification Search .............. 416/243, 416/223 R, DIG. 2
See application file for complete search history.

(56) References Cited

U.S. PATENT DOCUMENTS

| | | | |
|---|---|---|---|
| 4,872,812 A | 10/1989 | Hendley et al. | |
| 5,352,092 A * | 10/1994 | Ferleger et al. | 416/223 A |
| 5,911,679 A | 6/1999 | Farrell et al. | |
| 6,358,003 B2 | 3/2002 | Schlechtriem | |
| 2006/0165520 A1 | 7/2006 | Guemmer | |
| 2006/0288686 A1 | 12/2006 | Cherry et al. | |

FOREIGN PATENT DOCUMENTS

| | | |
|---|---|---|
| DE | 19812624 | 9/1999 |
| EP | 0441097 | 8/1991 |
| EP | 1118747 | 7/2001 |
| EP | 1134427 | 9/2001 |
| EP | 1186747 | 3/2002 |
| EP | 1657401 | 5/2006 |

OTHER PUBLICATIONS

European Search Report dated May 20, 2010.
German Search Report dated Jun. 12, 2008.

* cited by examiner

*Primary Examiner* — Edward Look
*Assistant Examiner* — Dwayne J White
(74) *Attorney, Agent, or Firm* — Timothy J. Klima; Shuttleworth & Ingersoll, PLC

(57) ABSTRACT

A turbomachine has at least one rotor blade row designed for extremely high work coefficients (high-load), which—in its center section and/or averaged over the blade height—provides for an essentially swirl-free relative outflow. The respective rotor in its trailing edge area is essentially orientated in meridional direction, with the mean or averaged exit metal angle of the rotor blade ranging from −10 to +5 degrees.

14 Claims, 10 Drawing Sheets

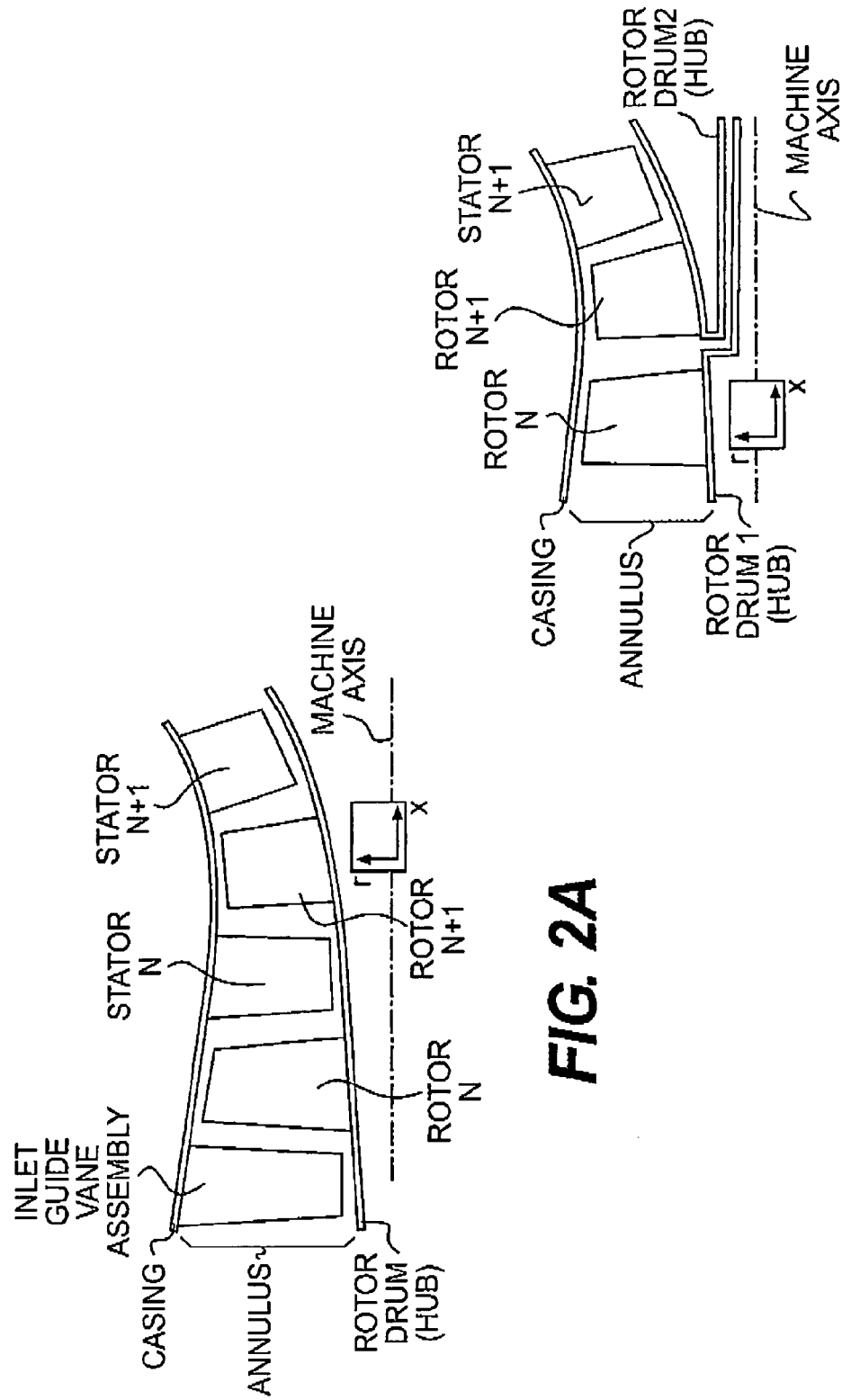

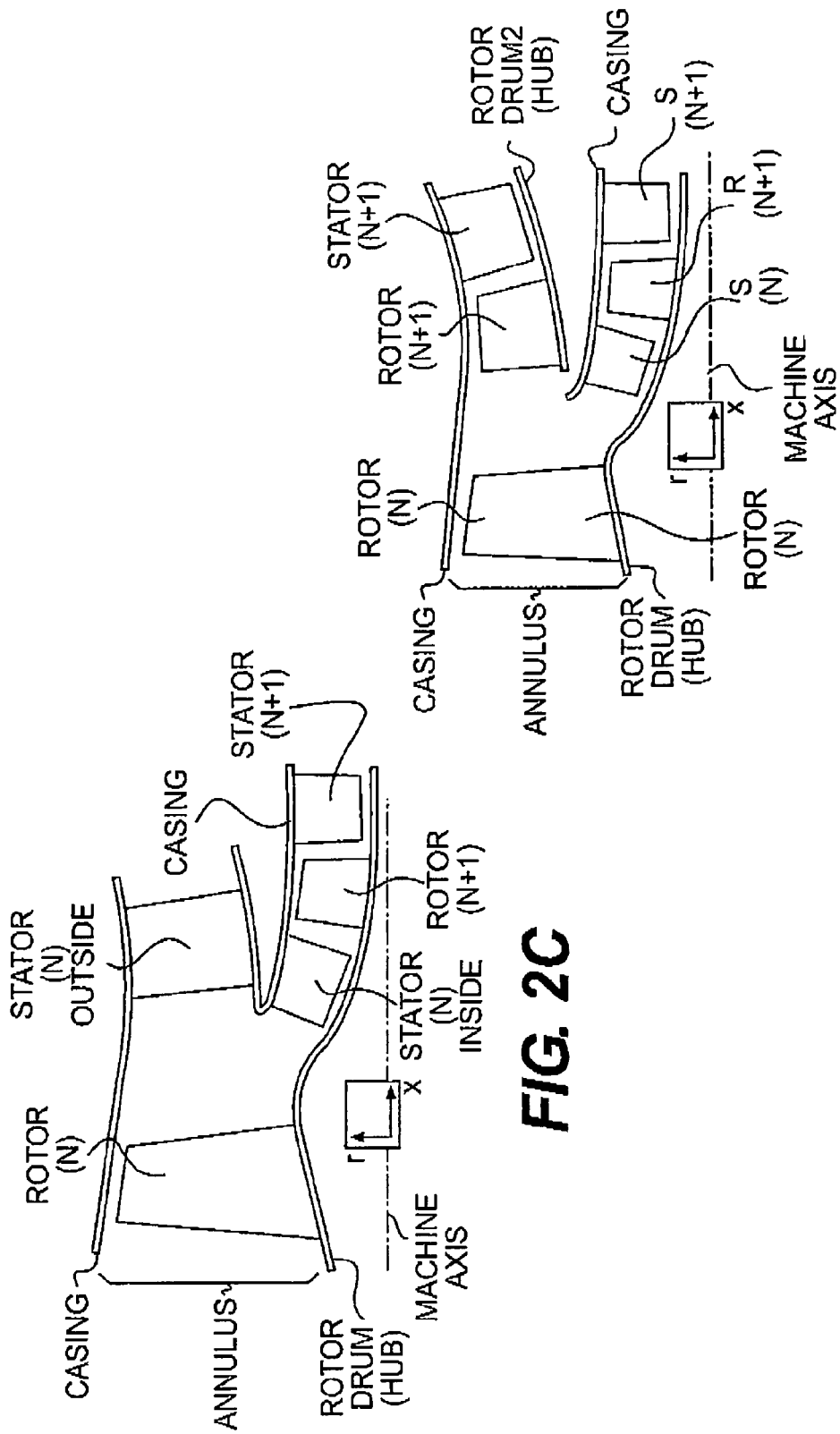

TURBOMACHINE WITH ROTORS OF HIGH SPECIFIC ENERGY TRANSFER

Figure 1:
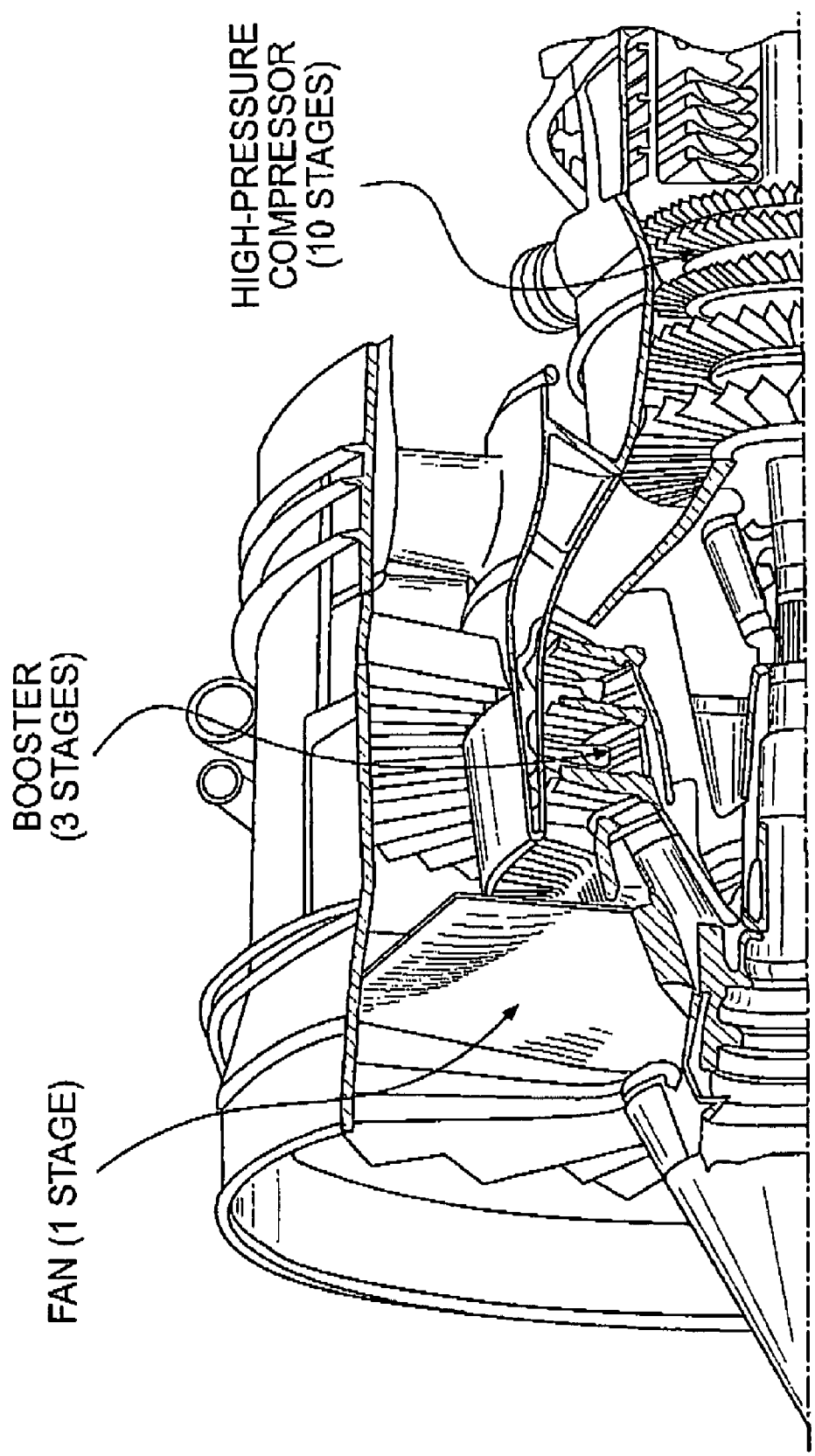

This application claims priority to German Patent Application DE102006026968.3 filed Jun. 9, 2006, the entirety of which is incorporated by reference herein.

The present invention relates to turbomachines, such as blowers, compressors, pumps and fans of the axial and semi-axial type with gaseous or liquid working medium (fluid).

The turbomachine includes one or several stages. Each stage comprises a rotor and a stator.

The rotor includes a number of blades which are connected to the rotating shaft of the machine and transfer energy to the working medium. The rotor can be shrouded or shroudless at the outer blade end.

The stator includes a number of stationary vanes which can be provided with a fixed or free blade ends on the hub side and on the casing side. The rotor drum and the blading are enclosed by a casing. The machine may include a stator upstream of the first rotor (inlet guide vane assembly).

Instead of being fixed, the stators can be variable and provided with a spindle accessible from outside of the annulus to accomplish this variation.

The turbomachine may alternatively include a bypass configuration such that the single-flow annulus divides into two concentric annuli behind a certain blade row, with each of these annuli housing at least one further blade row.

Furthermore, multi-stage types of said turbomachine may have two counter-rotating shafts, with the direction of rotation of the rotor blade rows alternating between stages. Here no stators exist between counter-rotating rotors.

FIG. 2 shows, by way of example, four turbomachine configurations, which are feasable in accordance with the present description.

The stability limit of turbomachines, such as blowers, compressors, pumps and fans, decisively depends upon the selection of the work coefficient (specific enthalpy transformation $\Delta h$ relative to the square of the rotor blade velocity $U^2$). For this reason, a work coefficient of 0.5 is normally not exceeded. Very high rotor blade velocities are then to be selected for the high stage pressure ratios required today which may lead to a relative inflow at the rotor in the supersonic range, if applicable. In this case, the state of the art provides for rotor blade profiles with high stagger angle, low profile camber and high relative swirl component of the rotor outflow velocity. These properties involve a steeply inclined stage characteristic (stage pressure ratio versus mass flow). Accordingly, a minor decrease of the mass flow leads to a considerable increase of the stage pressure ratio which, in the case of multi-stage turbomachines, conduces to a rapidly increasing detuning of the individual stages. The distance between the operating line and the stability limit in the characteristics of the turbomachine that is required to ensure safe operation must, therefore, be very large. For an engine compressor, for example, 25 to 30 percent of the design pressure ratio is to be provided as stability margin.

Designs according to the state of the art reflect work coefficients below 0.5. Compliance with this design criterion requires very high rotor blade velocities and/or a large number of stages, respectively, to yield high pressure ratios of the turbomachine. In addition, a great degree of stability margin is to be provided.

Therefore, in high-pressure compressors of aero-engines, for example, rotor inflow mach numbers significantly beyond 1 are permitted, at correspondingly high rotor blade velocities, with the consequence of high flow losses. In such a compressor, the total characteristic, as well as each individual stage characteristic, is very steep, resulting in severe stage detuning in part-load operation. The number of high-pressure compressor stages nevertheless is always 6 or more.

A slightly different problem applies to the booster stages of a two-shaft engine. Due to the direct speed coupling of the booster stages to the fan, the rotor blade velocity available to them is only low, as a result of which, according to the state of the art, an extremely high number of booster stages is required for a small increase of the pressure ratio. FIG. 1 here shows the state of the art on the example of a compressor system of an aero-engine in the medium-thrust category.

A broad aspect of the present invention is to provide a turbomachine of the type discussed above, which while avoiding the disadvantages of the state of the art and maintaining sufficient stability, enables a highly efficient increase of the realizable value of the work coefficient by means of a specific rotor configuration.

It is a particular object of the present invention to provide at least one solution to the above problems through the features described herein. Further advantageous embodiments of the present invention will be apparent from the description below.

The present invention, in detail, relates to a turbomachine with at least one rotor blade row designed for extremely high work coefficients which—in its center section and/or averaged over the blade height—provides for an essentially swirl-free absolute inflow on the one hand and produces an essentially swirl-free relative outflow on the other hand.

An essentially swirl-free absolute inflow is here characterized in that only assemblies without deflecting struts or blading are arranged upstream of the respective rotor, or the upstream blading or struts are essentially orientated in meridional direction in the area of their trailing edge.

An essentially swirl-free relative outflow is characterized in that the respective rotor is essentially orientated in meridional direction in the area of its trailing edge. The mean or averaged exit metal angle of the rotor blade (in combination with a mean or averaged entry metal angle of more than 40 degrees) must here range from −10 to +5 degrees.

The present invention, more particularly, relates to the application of the high-load (HL) rotor design described herein to the first rotor blade row arranged in flow direction downstream of the fan in the core flow section of an aero-engine.

Furthermore the present invention relates to the application of the rotor design concept to several stages of the turbomachine, following each other in the direction of flow.

In the state of the art, no mention is hitherto made of the possibility of decreasing the required degree of stability margin and simultaneously increasing the realizable value of the work coefficient just by specifically selecting the flow angles before and behind the rotor, and thus the design of the rotor blade.

Figure 5:
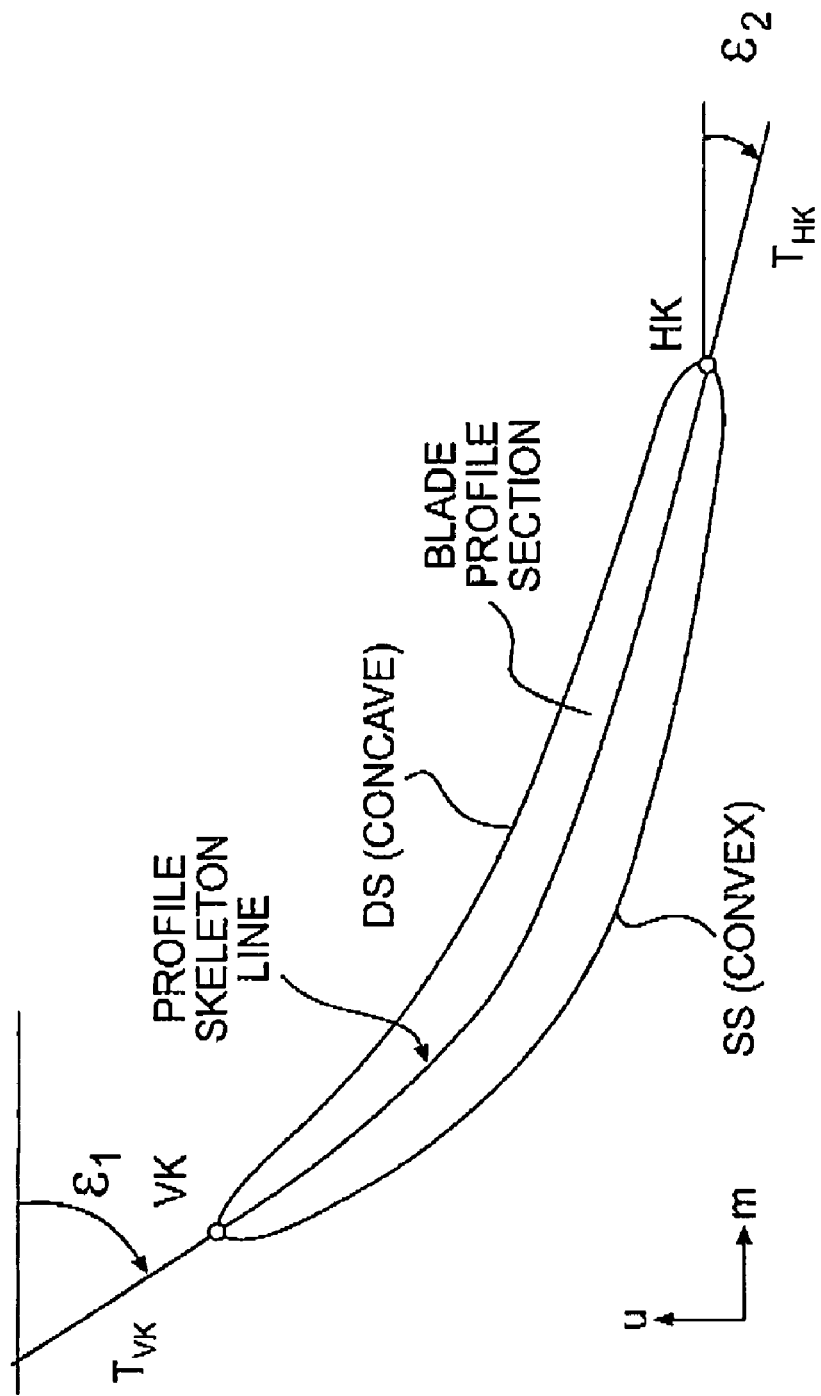
Figure 6:
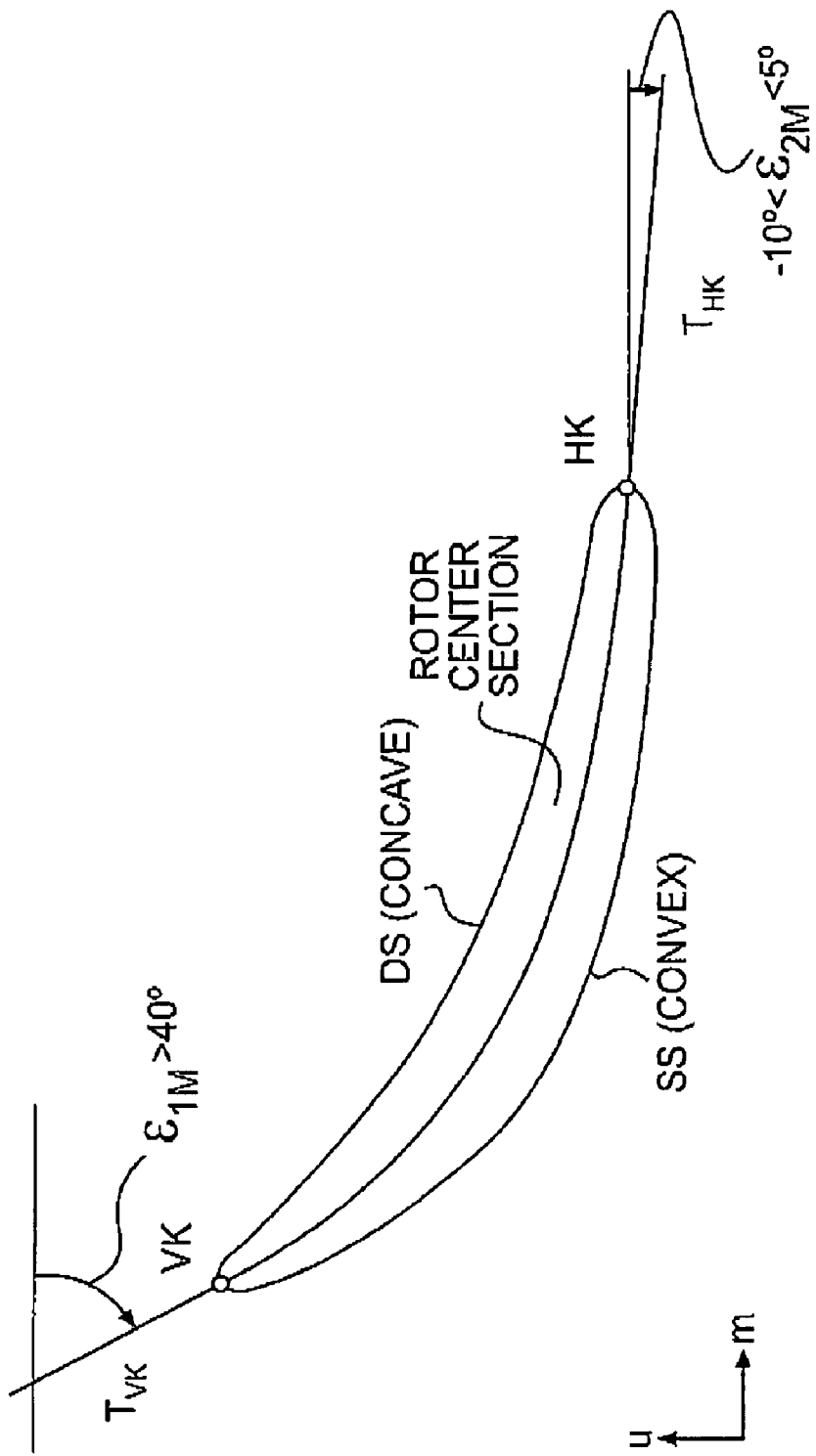
Figure 7:
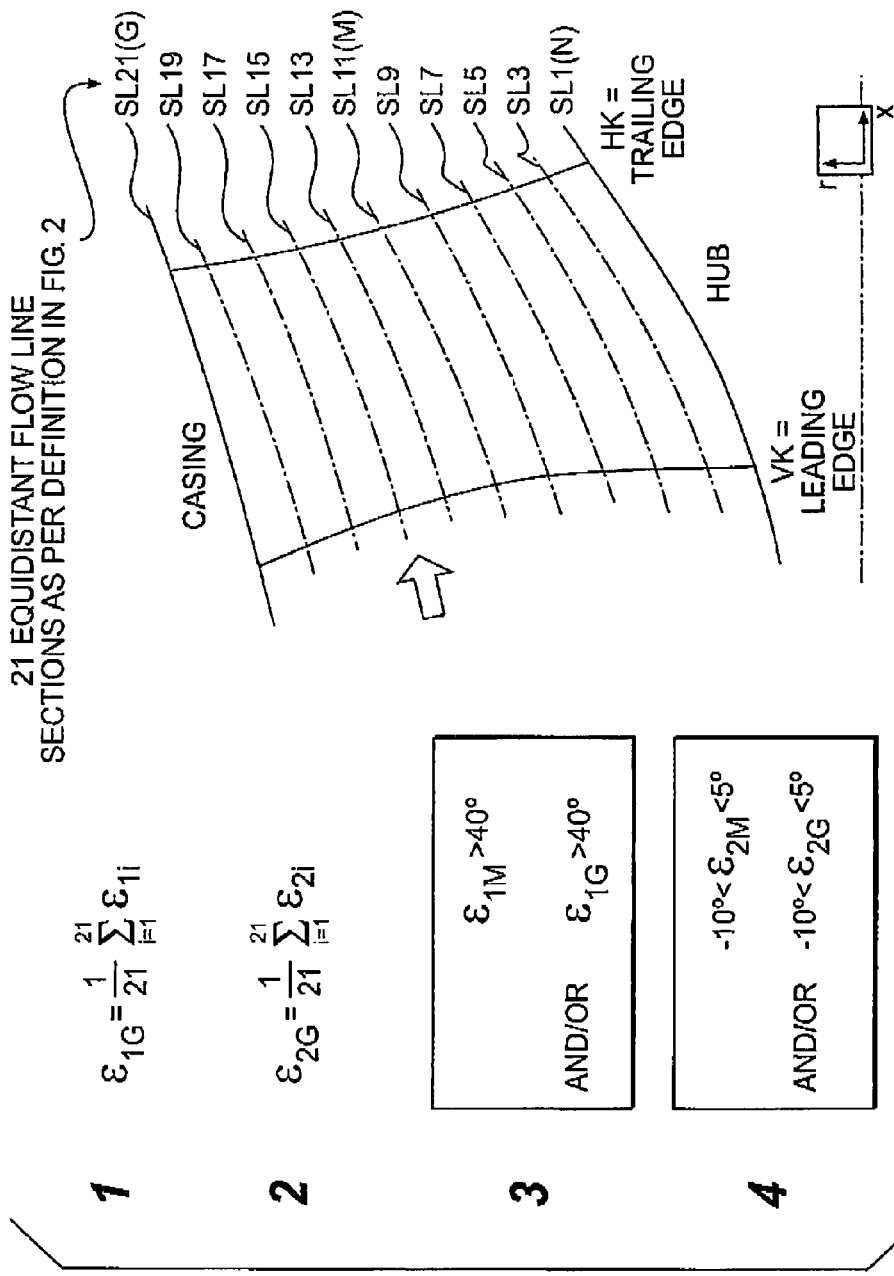
Figure 8:
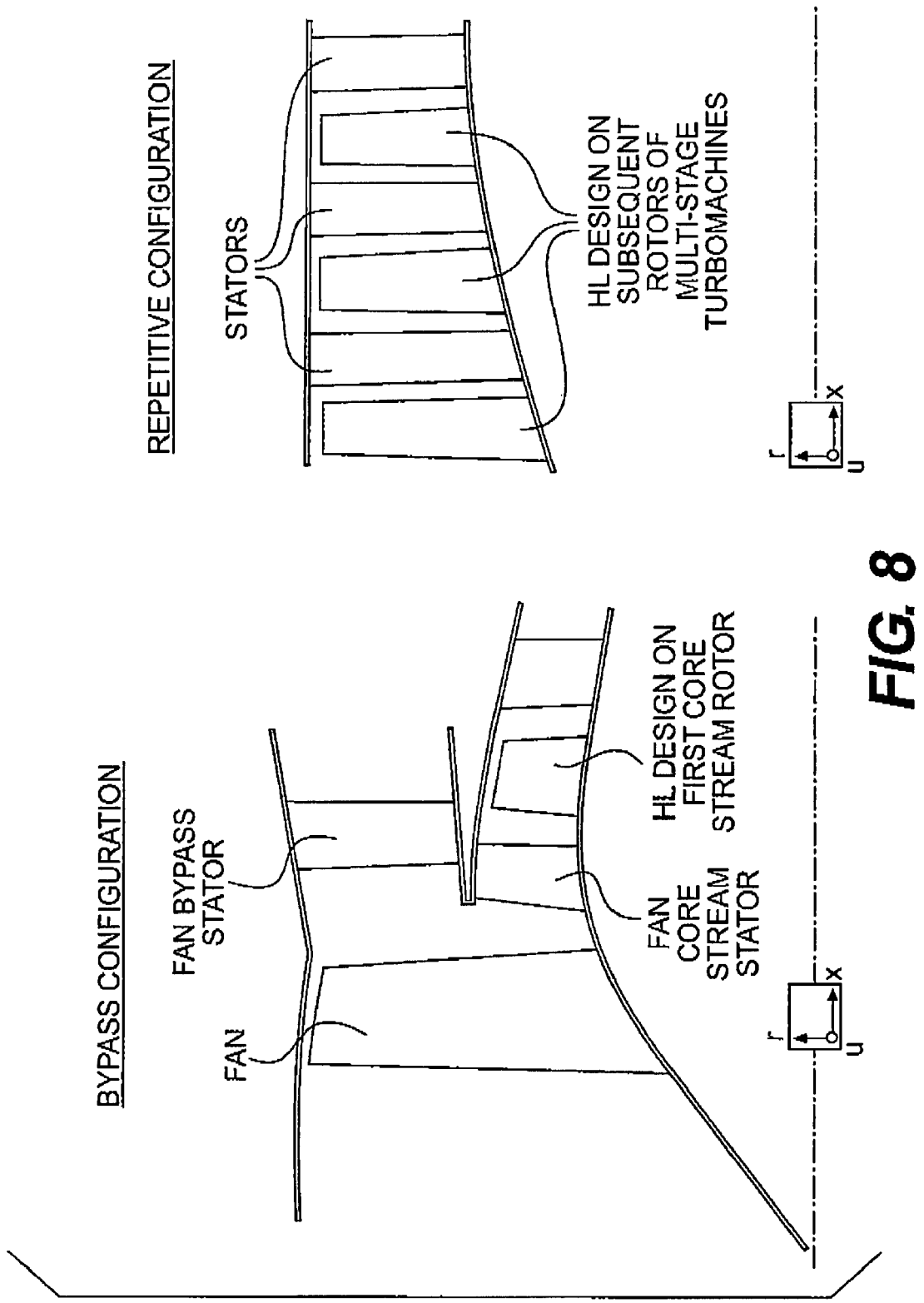

The present invention is more fully described in light of the accompanying drawings showing preferred embodiments. In the drawings, FIG. 1 shows an example for a compressor system (turbomachine) of an aero-engine in the medium-thrust category (state of the art), FIG. 2 is a schematic representation of turbomachines covered by the present invention, FIG. 3 shows the definition of meridional flow lines and flow line profile sections, FIG. 4a shows the rotor of a turbomachine in meridional section, FIG. 4b shows the arrangement of the velocity triangles and of the center section profile of the rotor according to the state of the art and the present invention, FIG. 5 shows the definition of the metal angles at the leading and trailing edge of a rotor blade or stator vane section, FIG. 6 shows the definition of the metal angles of the rotor in the flow line center section according to the present invention, FIG. 7 shows the determination of average values of quantities relevant to the present invention over the rotor blade height on the basis of 21 flow line sections, and FIG. 8 shows particularly effective configurations in accordance with the present invention with high-load (HL) design of the rotor.

Figure 3:
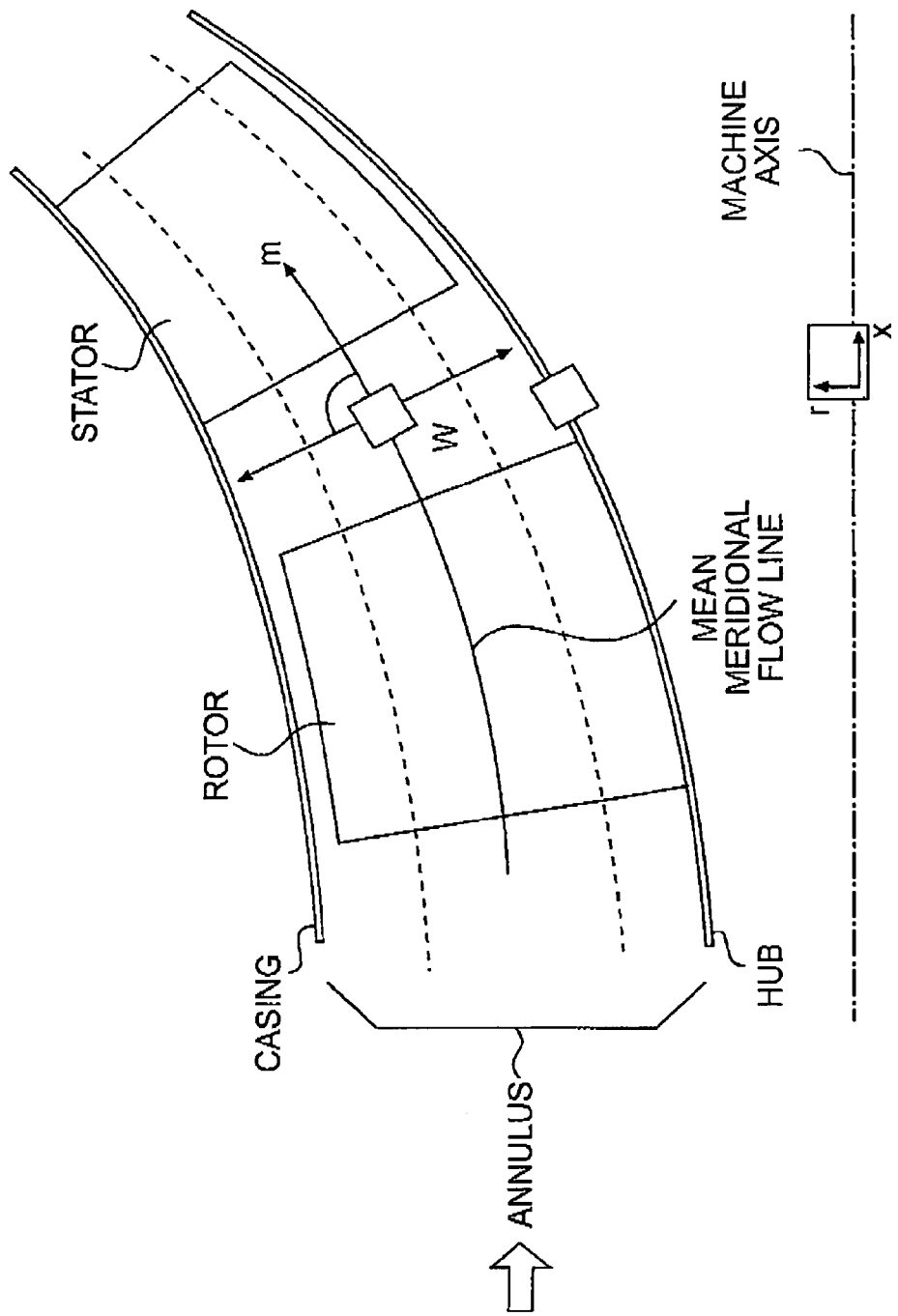

FIG. 3 provides a precise definition of the meridional flow lines and the flow line profile sections. The center meridional flow line is established by the geometrical center of the annulus. If a perpendicular is erected at any point of the center flow line, the development of the annulus duct width W along the flow path on the one hand and a number of perpendiculars on the other hand will be obtained, by which further meridional flow lines, with same relative subdivision in the direction of the duct height, are established. The intersection of a meridional flow line with a blade establishes a flow line profile section, the intersection of the center meridional flow line with a blade establishes the so-called center section.

Figure 4A:
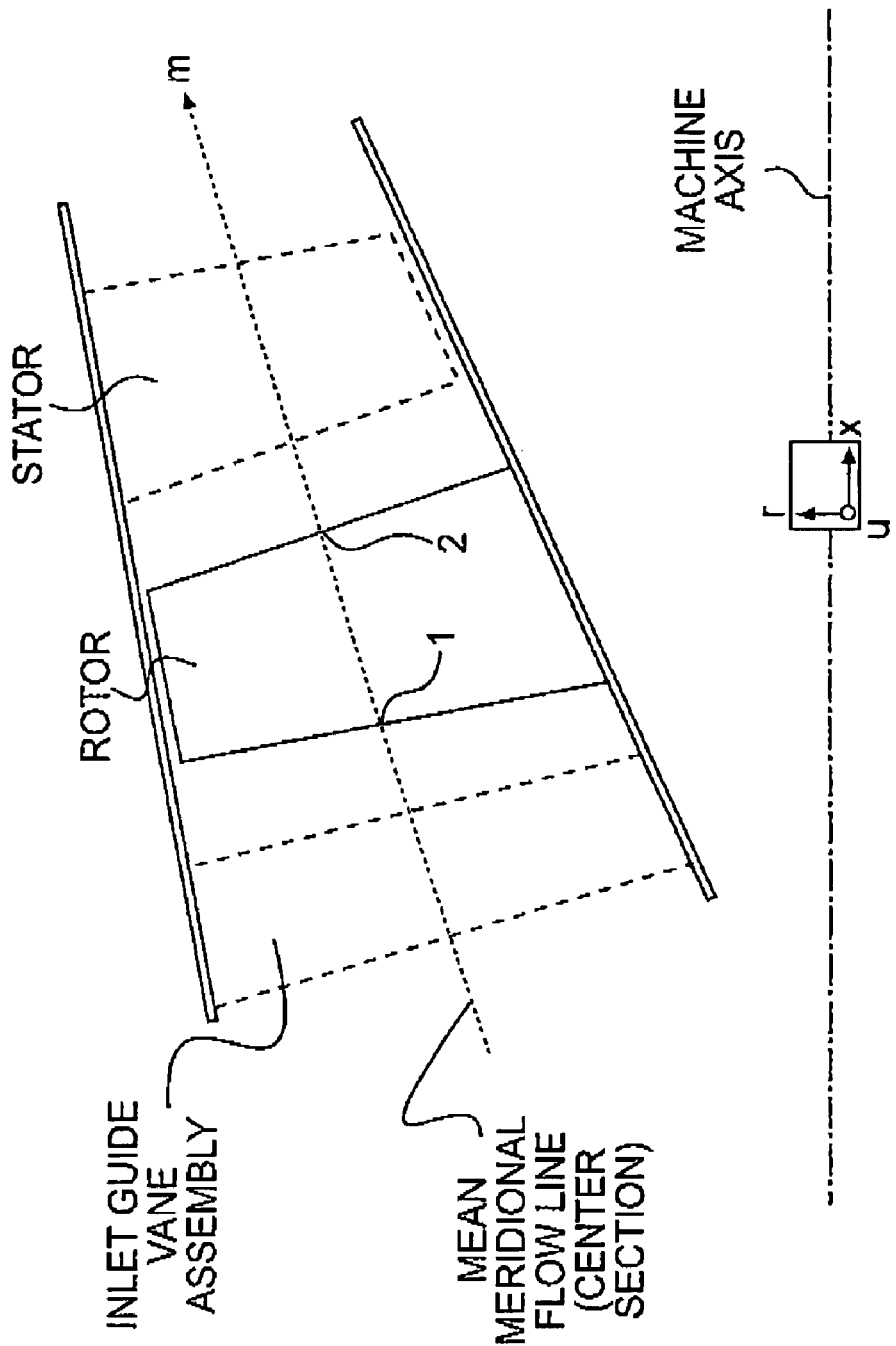

FIG. 4a shows a part of a turbomachine in meridional section, here schematically illustrated as an arrangement of inlet guide vane assembly (stator), rotor and stator. Also shown is the center meridional flow line which indicates the center section of the machine and whose intersection with the rotor edges is marked by the points 1 and 2. The present invention is related to aerodynamic and geometric conditions in the leading and trailing edge plane of the respective rotor. The invention-relevant quantities are represented as average values along the rotor blade height and directly in the center section (on the center meridional flow line).

Figure 4B:
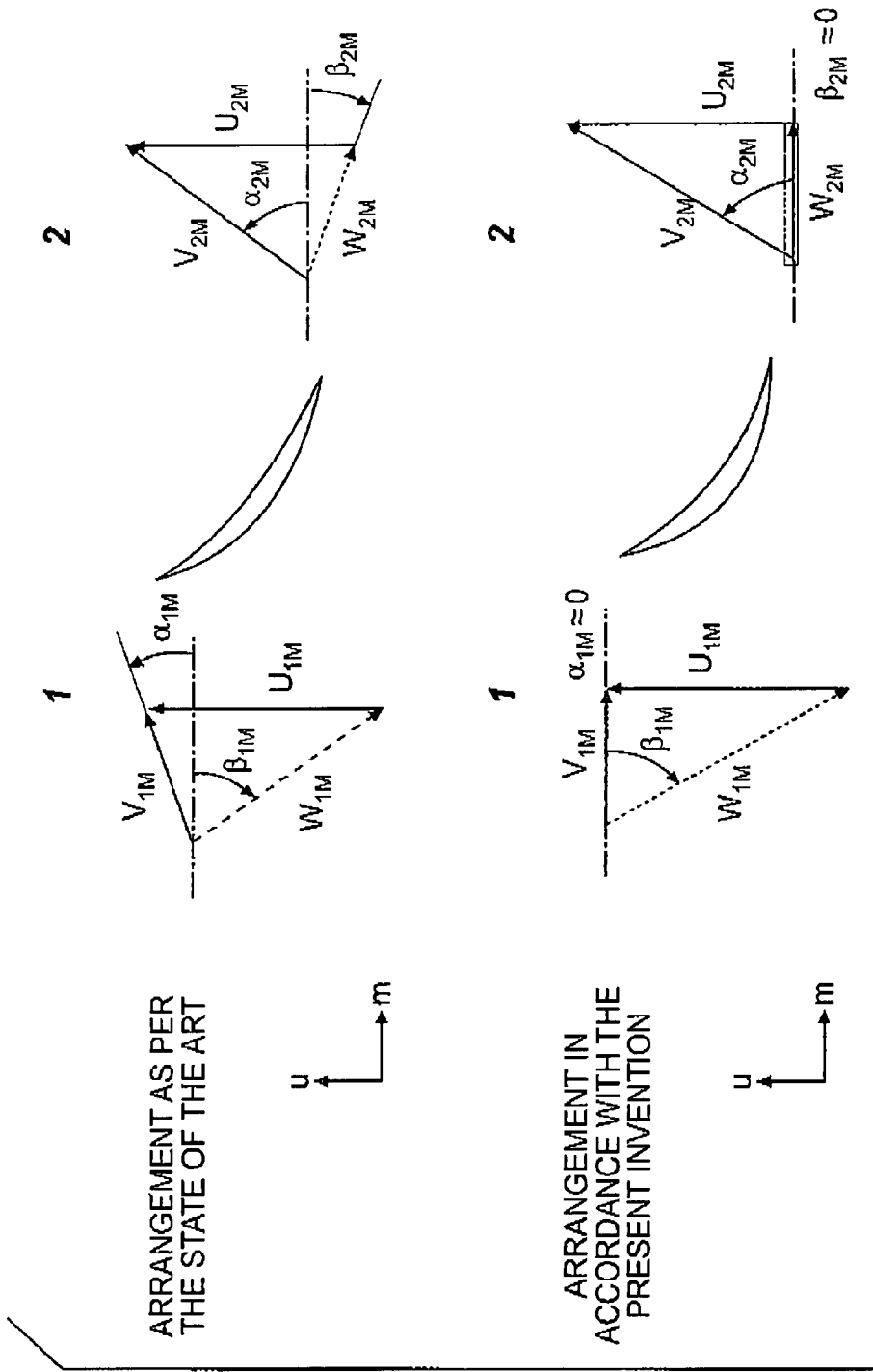

In FIG. 4b, for clarification of the solution according to the present invention, the rotor blade geometry and the flow velocity vectors in the rotor center section are considered. Shown are the velocity triangles (vectors) at point 1 before the rotor, the center section profile of the rotor and the velocity triangles (vectors) at point 2 behind the rotor.

The upper portion of illustrations in FIG. 4b shows an arrangement according to the state of the art. Characteristic here is a rotor inflow at the absolute velocity $V_{1M}$ under the absolute inflow angle $\alpha_{1M}$. Angle $\alpha_{1M}$ is usually distinctly larger than zero and in rare cases equal to zero. With the circumferential velocity $U_{1M}$, this results in a relative inflow at the velocity $W_{1M}$ under the relative inflow angle $\beta_{1M}$. The rotor center section profile has moderate camber and deflects the flow from $W_{1M}$ to $W_{2M}$. The resultant relative outflow angle $\beta_{2M}$, as a particular characteristic, remains significantly larger than zero, for example 30 degrees.

The bottom portion of illustrations in FIG. 4b shows an inventive arrangement with high-load (HL) design of the rotor. Characteristic here is a rotor inflow with absolute velocity $V_{1M}$ under the absolute inflow angle α1. Angle $\alpha_{1M}$ nearly amounts to zero (approximately freedom of swirl in the absolute system). With the circumferential velocity $U_{1M}$, this results in a relative inflow at the velocity $W_{1M}$ under the relative inflow angle $\beta_{1M}$.

The rotor center section profile has a very pronounced camber and strongly deflects the flow from $W_{1M}$ to $W_{2M}$ (extreme flow diversion). The resultant relative outflow angle $\beta_{2M}$ nearly amounts to zero (approximately freedom of swirl in the relative system).

Now, the inventive form of the velocity triangles is to be applied to geometrical features of the rotor blade which can be used as decisive design criterion.

FIG. 5 firstly shows, in schematical representation, the definition of the metal angles at the leading and trailing edges of a rotor blade or a stator vane. Shown is a flow line profile section of the blade on a meridional flow surface (u-m plane). To find the metal angles, the profile skeleton line, that is, the center line between the pressure side (DS) and the suction side (SS) of the profile, must be determined in the plane of the blade profile section. The tangents $T_{VK}$ and $T_{HK}$ drawn to the profile skeleton line in the leading and trailing edge points (VK, HK) quantify the orientation of the profile. The entry metal angle $\epsilon_{1M}$ is finally established between tangent $T_{VK}$ and the meridional direction m, the exit metal angle $\epsilon_{2M}$ between the tangent $T_{HK}$ and the meridional direction m.

FIG. 6 now shows the center section of a rotor with dimensions for the metal angles $\epsilon_{1M}$ and $\epsilon_{2M}$. Accordingly, as per the present invention, a high entry metal angle $\epsilon_{1M}$ of more than 40 degrees is to be combined with an exit metal angle $\epsilon_{2M}$ specified between −10 and +5 degrees. This leads to a deflection or camber, respectively, in the center section of the rotor which is far beyond the state of the art.

Representation of the velocity triangles and the rotor profile form was firstly made here on the center section of the rotor. However, it shall also be made for a number of flow line sections of the rotor at other blade heights, to also determine, besides the quantities in the center section, the invention-relevant quantities averaged over the blade height.

The method of determining the quantities averaged over the blade height is shown in FIG. 7. Accordingly, the averaged rotor entry metal angle $\epsilon_{1G}$ is established by arithmetic averaging of the local values determined at 21 equidistant flow line sections. The averaged rotor exit metal angle $\epsilon_{2G}$ is to be established in a similar manner. See formulas (1) and (2) in FIG. 7.

The inventive high-load (HL) design of a rotor is finally to be described as follows, see formulas (3) and (4) in FIG. 7:

For the entry and exit metal angles the following shall apply:
a) $\epsilon_{1M}$>40 degrees and/or $\epsilon_{1G}$>40 degrees, and
b) −10 degrees<$\epsilon_{2M}$<+5 degrees and/or −10 degrees<$\epsilon_{2G}$<+5 degrees Particularly effective use of the HL rotor design is made if, in accordance with the present invention, it is applied to the first rotor arranged in the core flow area of a turbomachine with bypass configuration, as shown in FIG. 8.

Further advantages for the operating behavior of individual stages in a multi-stage arrangement result from the repetitive application of the HL rotor design in accordance with the present invention over several stages immediately following each other in the direction of flow.

The high-load rotor design specified in the present invention provides, by simple means, for an as yet unattained level of performance concentration and compactness in turbomachines, such as blowers, compressors, pumps and fans. Furthermore, a significantly improved stage tuning is obtained for multi-stage turbomachines in part-load operation. In particular on machines bound to run at low speed, for example booster stages of an aero-engine, loadability can be increased by the factor 2 to 3. For a given pressure ratio of the turbomachine the number of components installed, as compared to conventionally designed boosters, can be reduced by at least 50%, with efficiency being maintained or even improved by up to 2 percent. A reduction in cost and weight of the engine by approx. 5 percent is achieved. When using the inventive concept in the compressor of an aero-engine with approx.

25,000 pound thrust, an immediate reduction of the specific fuel consumption of up to 0.5% is achieved. A further potential lies in the reduced engine length and the reducibility of the running gaps in the core engine sector (high-pressure compressor) resulting therefrom.

What is claimed is:

1. A turbomachine having at least one high load blade row of rotor blades designed for work coefficients defined by a specific enthalpy transformation Δh relative to a square of a rotor blade velocity U, which, in at least one of its center section and averaged over a blade height, provides for an essentially swirl-free relative outflow, wherein the respective rotor blades in their trailing edge area are essentially orientated in a meridional direction m, with at least one of entry metal angles of the rotor blades at the center section $\epsilon_{1m}$ and entry metal angles of the rotor blades averaged over the height of the rotor blades $\epsilon_{1G}$ being >40 degrees and at least one of exit metal angles of the rotor blades at the center section $\epsilon_{2M}$ and exit metal angles of the rotor blades averaged over the height of the rotor blades $\epsilon_{2G}$ ranging from −10 to +5 degrees;

wherein, a center line between a pressure side (DS) and a suction side (SS) of a blade profile, determined in a plane of a section of the blade profile, forms a profile skeleton line, with tangents $T_{VK}$ and $T_{HK}$ drawn to the profile skeleton line at leading and trailing edge points (VK, HK) to quantify an orientation of the profile, the entry metal angles being established between tangent $T_{VK}$ and the meridional direction m, the exit metal angles between the tangent $T_{HK}$ and the meridional direction m.

2. A turbomachine in accordance with claim 1 having at least one rotor blade row designed for work coefficients defined by a specific enthalpy transformation Δh relative to a square of a rotor blade velocity U, which, in at least one of its center section and averaged over the blade height, provides for an essentially swirl-free absolute inflow, wherein any assemblies arranged upstream of the respective rotor are either without deflecting struts or blading, or the upstream struts or blading are essentially orientated in meridional direction in an area of their trailing edges.

3. A turbomachine in accordance with claim 1, wherein the high-load rotor design is applied to a first rotor blade row arranged in a flow direction downstream of a fan in a core flow section of an aero-engine.

4. A turbomachine in accordance with claim 2, wherein the high-load rotor design is applied to a first rotor blade row arranged in a flow direction downstream of a fan in a core flow section of an aero-engine.

5. A turbomachine in accordance with claim 4, wherein the high-load rotor design is applied to several rotor stages following each other in a direction of flow.

6. A turbomachine in accordance with claim 1, wherein the high-load rotor design is applied to several rotor stages following each other in a direction of flow.

7. A turbomachine in accordance with claim 2, wherein the high-load rotor design is applied to several rotor stages following each other in a direction of flow.

8. A turbomachine in accordance with claim 1, wherein the entry metal angles of the rotor blades at the center section $\epsilon_{1M}$ are >40 degrees and the exit metal angles of the rotor blades at the center section $\epsilon_{2M}$ range from −10 to +5 degrees.

9. A turbomachine in accordance with claim 1, wherein the entry metal angles of the rotor blades at the center section $\epsilon_{1M}$ are >40 degrees and the exit metal angles of the rotor blades averaged over the height of the rotor blades $\epsilon_{2G}$ range from −10 to +5 degrees.

10. A turbomachine in accordance with claim 1, wherein the entry metal angles of the rotor blades averaged over the height of the rotor blades $\epsilon_{1G}$ are >40 degrees and the exit metal angles of the rotor blades at the center section $\epsilon_{2M}$ range from −10 to +5 degrees.

11. A turbomachine in accordance with claim 1, wherein the entry metal angles of the rotor blades averaged over the height of the rotor blades $\epsilon_{1G}$ are >40 degrees and the exit metal angles of the rotor blades averaged over the height of the rotor blades $\epsilon_{2G}$ range from −10 to +5 degrees.

12. A turbomachine in accordance with claim 1, wherein the entry metal angles of the rotor blades at the center section $\epsilon_{1M}$ and the entry metal angles of the rotor blades averaged over the height of the rotor blades $\epsilon_{1G}$ are both >40 degrees.

13. A turbomachine in accordance with claim 12, wherein the exit metal angles of the rotor blades at the center section $\epsilon_{2M}$ and the exit metal angles of the rotor blades averaged over the height of the rotor blades $\epsilon_{2G}$ both range from −10 to +5 degrees.

14. A turbomachine in accordance with claim 1, wherein the exit metal angles of the rotor blades at the center section $\epsilon_{2M}$ and the exit metal angles of the rotor blades averaged over the height of the rotor blades $\epsilon_{2G}$ both range from −10 to +5 degrees.

* * * * *